US012597832B2

(12) United States Patent
Mori et al.

(10) Patent No.: US 12,597,832 B2
(45) Date of Patent: Apr. 7, 2026

(54) METHOD FOR LAMINATED CORE OF ROTATING ELECTRIC MACHINE

(71) Applicant: Mitsubishi Electric Corporation, Tokyo (JP)

(72) Inventors: Akihito Mori, Tokyo (JP); Kota Hirohashi, Tokyo (JP); Kazuya Hasegawa, Tokyo (JP); Tomoyuki Kinoshita, Tokyo (JP); Norihiro Murata, Tokyo (JP); Kimiyasu Furusawa, Tokyo (JP); Masahiro Yuya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 592 days.

(21) Appl. No.: 17/728,208

(22) Filed: Apr. 25, 2022

(65) Prior Publication Data

US 2023/0129627 A1 Apr. 27, 2023

(30) Foreign Application Priority Data

Oct. 22, 2021 (JP) ................................. 2021-172765

(51) Int. Cl.
*H02K 15/02* (2025.01)
(52) U.S. Cl.
CPC .................................... *H02K 15/02* (2013.01)

(58) Field of Classification Search
CPC .. H02K 15/02; H02K 15/024; H02K 2213/03; Y02T 10/64
See application file for complete search history.

(56) References Cited

U.S. PATENT DOCUMENTS

| | | | | |
|---|---|---|---|---|
| 10,284,058 | B2 * | 5/2019 | Hashimoto | ............. H02K 15/02 |
| 2011/0232076 | A1 * | 9/2011 | Matsubara | ............. B23P 21/004 29/564 |
| 2012/0058313 | A1 * | 3/2012 | Nagai | .................. H02K 15/021 228/178 |

FOREIGN PATENT DOCUMENTS

| | | | | |
|---|---|---|---|---|
| JP | 2571907 | Y2 | 5/1998 | |
| JP | 2581831 | Y2 | 9/1998 | |
| JP | 2009291059 | A * | 12/2009 | |
| WO | WO-2011118264 | A1 * | 9/2011 | ............. B21D 28/02 |

* cited by examiner

*Primary Examiner* — Minh N Trinh
(74) *Attorney, Agent, or Firm* — Sughrue Mion, PLLC

(57) ABSTRACT

A manufacturing method for a laminated core of a rotating electric machine includes a laminating step and a core separating step. In the laminating step, a plurality of core elements are laminated, thereby forming an element laminate. In the core separating step, under a state in which the element laminate is pressed in a lamination direction of the plurality of core elements, a part of the element laminate is moved from the element laminate in a direction orthogonal to the lamination direction by a set dimension in the lamination direction, thereby obtaining a separated laminate.

9 Claims, 14 Drawing Sheets

START

PUNCHING STEP — S1

DISCHARGING STEP — S2

LAMINATING STEP — S3

CORE SEPARATING STEP — S4

FIXING STEP — S5

END

START

PRESS IN LAMINATION DIRECTION — S41

LOWER HOLDING DEVICE — S42

CLOSE GRASPING DEVICE — S43

RAISE GRASPING DEVICE — S44

RAISE HOLDING DEVICE — S45

RAISE FIRST RECEIVER — S46

END

METHOD FOR LAMINATED CORE OF ROTATING ELECTRIC MACHINE

BACKGROUND OF THE INVENTION

1. Field of the Invention

This disclosure relates to a manufacturing method for a laminated core of a rotating electric machine, and a manufacturing apparatus for a laminated core of a rotating electric machine.

2. Description of the Related Art

In a related-art core-element take-out apparatus, a plurality of core elements are supplied onto a base under a state in which the plurality of core elements are laminated in an up-and-down direction. The base is formed of two rails. A push-out blade is provided between the two rails. The push-out blade moves in a horizontal direction along the base so that, from a laminate formed by laminating the plurality of core elements, a part of the laminate is taken out. A magnet is provided at a distal end of the push-out blade (see, for example, Japanese Registered Utility Model Publication No. 2571907).

In the related-art core-element take-out apparatus as described above, the magnet is provided at the distal end of the push-out blade. Thus, there is a risk in that core elements are attracted more than required, with the result that a dimension of the laminated core in a lamination direction of the core elements becomes excessively large.

SUMMARY OF THE INVENTION

This disclosure has been made to solve the problem described above, and has an object to obtain a manufacturing method for a laminated core of a rotating electric machine and a manufacturing apparatus for a laminated core of a rotating electric machine, which are capable of improving a dimensional accuracy of a laminated core.

According to at least one embodiment of this disclosure, there is provided a manufacturing method for a laminated core of a rotating electric machine, including: a laminating step of laminating a plurality of core elements each punched out from an electromagnetic steel sheet, to thereby form an element laminate; a core separating step of moving, under a state in which the element laminate is pressed in a lamination direction of the plurality of core elements, a part of the element laminate from the element laminate in a direction orthogonal to the lamination direction by a set dimension in the lamination direction, to thereby obtain a separated laminate; and a fixing step of fixing the plurality of core elements included in the separated laminate to one another.

According to at least one embodiment of this disclosure, there is provided a manufacturing apparatus for a laminated core of a rotating electric machine, including: a pressing device configured to press an element laminate formed by laminating a plurality of core elements each punched out from an electromagnetic steel sheet in a lamination direction of the plurality of core elements; and a core separating device configured to move a part of the element laminate from the element laminate being pressed by the pressing device in a direction orthogonal to the lamination direction by a set dimension in the lamination direction, to thereby obtain a separated laminate.

According to this disclosure, a dimensional accuracy of the laminated core can be improved.

DESCRIPTION OF THE EMBODIMENTS

Now, embodiments of this disclosure are described with reference to the drawings.

First Embodiment

Figure 1:
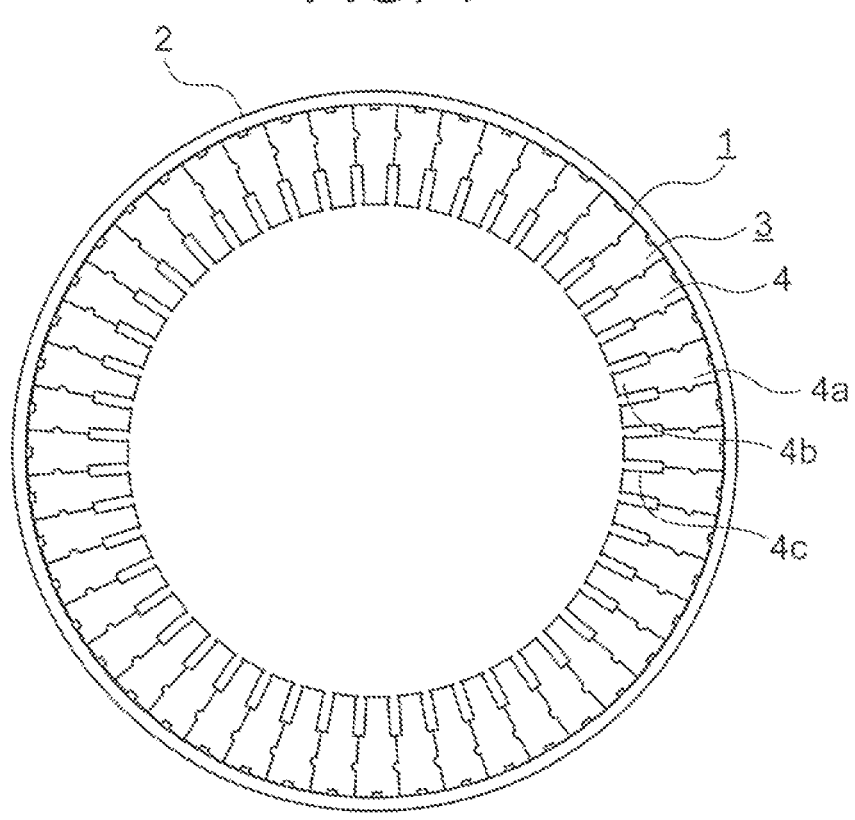
FIG. 1 is a plan view for illustrating a main part of a stator of a rotating electric machine in a first embodiment of this disclosure.

FIG. 1 is a plan view for illustrating a main part of a stator of a rotating electric machine in a first embodiment of this disclosure. The stator includes a laminated core 1 having a cylindrical shape and a frame 2 having a cylindrical shape. An outer peripheral surface of the laminated core 1 is in contact with an inner peripheral surface of the frame 2 over the entirety in a circumferential direction of the laminated core 1. The circumferential direction of the laminated core 1 is a direction along a circumference about an axial center of the laminated core 1.

The laminated core 1 is formed by combining a plurality of core blocks 3. Each core block 3 forms a part of the laminated core 1 in the circumferential direction. The plurality of core blocks 3 are arranged along the circumferential direction of the laminated core 1 and are coupled to one another. In FIG. 1, forty-eight core blocks 3 are used. When the number of segments of the laminated core 1 in the circumferential direction of the laminated core 1 is N, N is a non-negative integer other than 1. In FIG. 1, N=48 is given.

Figure 2:
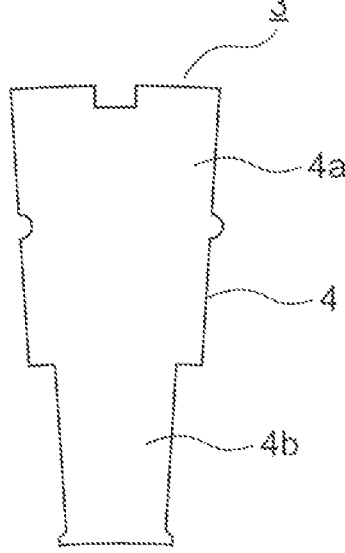
FIG. 2 is an enlarged plan view for illustrating one of a plurality of core blocks of FIG. 1.
Figures 3, 4:
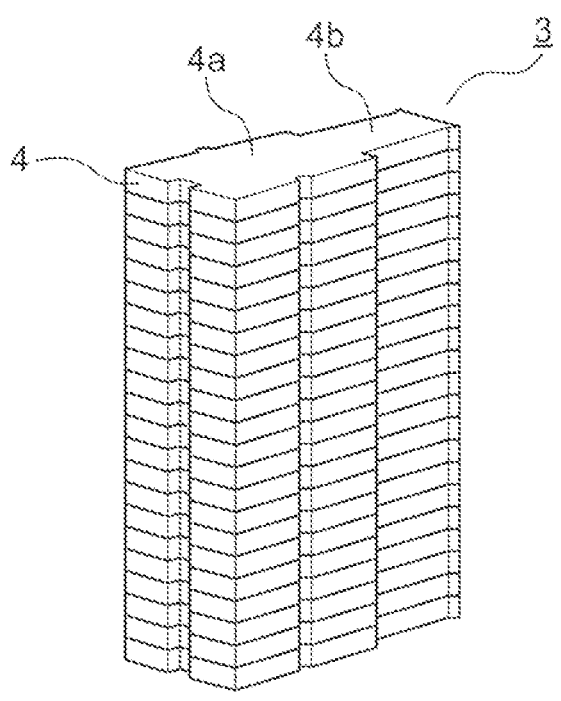
FIG. 3 is a perspective view for illustrating the core block of FIG. 2.
FIG. 4 is a configuration view for illustrating an element manufacturing apparatus for manufacturing core elements of FIG. 3.

FIG. 2 is an enlarged plan view for illustrating one of the plurality of core blocks 3 of FIG. 1. FIG. 3 is a perspective view for illustrating the core block 3 of FIG. 2. The core block 3 is formed by laminating a plurality of core elements 4. The plurality of core elements 4 are laminated in an axial direction of the laminated core 1. The axial direction of the laminated core 1 is a direction along the axial center of the laminated core 1.

The plurality of core elements 4 are fixed to one another by welding, bonding, adhesion, or winding of a lead wire. Examples of the welding include laser welding and tungsten inert gas (TIG) welding. The fixing method by the winding of a lead wire is a method of fixing the plurality of core elements 4 to one another by winding a lead wire around the core block 3.

Further, each core element 4 includes a yoke portion 4a and a tooth portion 4b. The yoke portion 4a is a portion to be coupled to adjacent two core blocks 3 in the laminated core 1. The tooth portion 4b projects from the yoke portion 4a toward an inner side in a radial direction of the laminated core 1. The radial direction of the laminated core 1 is a direction orthogonal to the axial center of the laminated core 1. The yoke portion 4a is located on an outer side in the radial direction of the laminated core 1 with respect to the tooth portion 4b.

As illustrated in FIG. 1, slots 4c are formed between adjacent tooth portions 4b in the laminated core 1. A coil (not shown) is inserted into each slot 4c.

Next, a manufacturing method for a laminated core and a manufacturing apparatus for a laminated core are described. FIG. 4 is a configuration view for illustrating an element manufacturing apparatus for manufacturing the core elements 4 of FIG. 3. The element manufacturing apparatus includes a press device 11, a die device 12, and a feed device 13.

The feed device 13 feeds, from an uncoiler (not shown), an electromagnetic steel sheet 10 having a band shape to the press device 11. In FIG. 4, the electromagnetic steel sheet 10 is fed in the direction indicated by the arrow A. In the uncoiler, the electromagnetic steel sheet 10 is wound in a roll shape.

The die device 12 is provided to the press device 11. Further, the die device 12 includes a punch and a die. The press device 11 uses the punch and the die to punch out the core elements 4 from the electromagnetic steel sheet 10.

Figure 5:
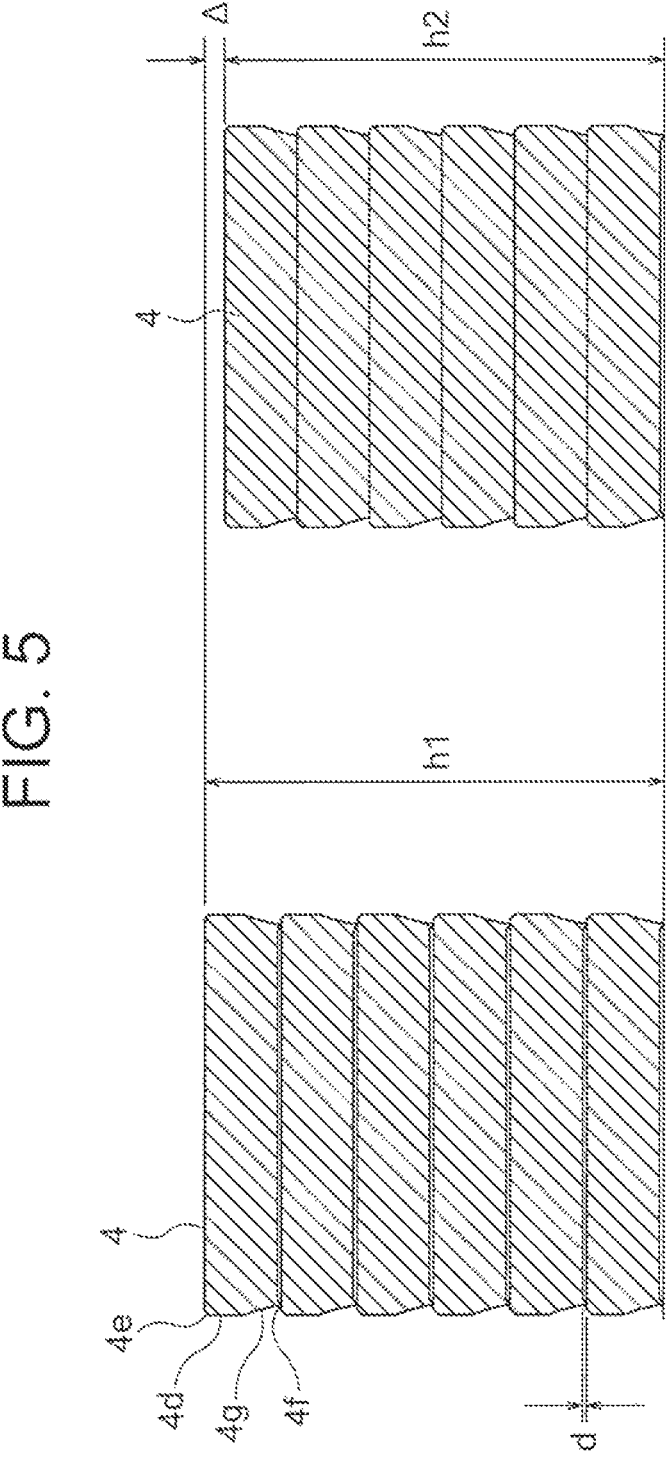
FIG. 5 is an enlarged explanatory view for illustrating a state in which a plurality of core elements manufactured by the element manufacturing apparatus of FIG. 4 are laminated.

FIG. 5 is an enlarged explanatory view for illustrating a state in which the plurality of core elements 4 manufactured by the element manufacturing apparatus of FIG. 4 are laminated. The left view of FIG. 5 shows a state in which the plurality of core elements 4 are simply laminated. The right view of FIG. 5 shows a state in which the plurality of core elements 4 are compressed from the state of the left view of FIG. 5 to such an extent that leads to limitation on further reduction in dimension of the plurality of core elements 4 in a lamination direction. In the following, the lamination direction of the plurality of core elements 4 is simply referred to as a lamination direction.

A work surface of the core element 4 having been punched out from the electromagnetic steel sheet 10 has a shear surface 4d, a rollover surface 4e, a burr surface 4f, and a fracture surface 4g. Each burr surface 4f slightly projects from a lower surface of the core element 4 and is in contact with an upper surface of an adjacent core element 4. Further, each core element 4 may be slightly warped.

Due to the influence of, for example, the burr surfaces 4f and the warpage of the core elements 4, an interlayer gap "d" may be formed between two core elements 4 adjacent to each other in the lamination direction. Thus, when the plurality of core elements 4 are pressed in the lamination direction, each core element 4 is elastically deformed.

When the plurality of core elements 4 are pressed in the lamination direction to a limit, a dimension h1 in the lamination direction given before the pressing is reduced to a dimension h2. Further, when the pressing force is cancelled, each core element 4 is restored so that the dimension in the lamination direction substantially returns to the dimension h1. Thus, a difference Δh between the dimension h1 and the dimension h2 is a dimensional range in which the laminate of the plurality of core elements 4 is elastically deformed in the lamination direction.

Figure 6:
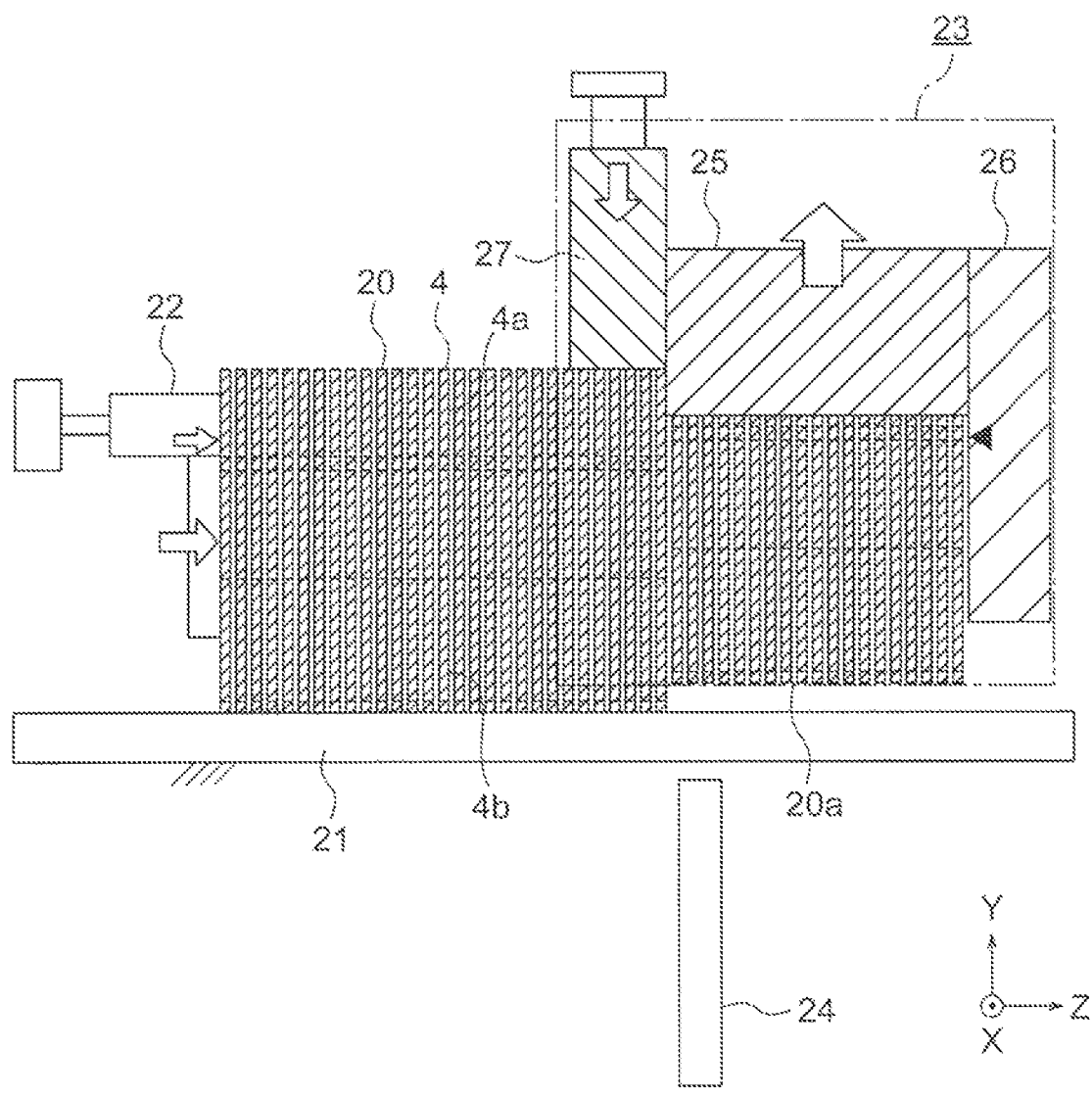
FIG. 6 is a side view for illustrating a main part of a manufacturing apparatus for a laminated core according to the first embodiment.
Figure 7:
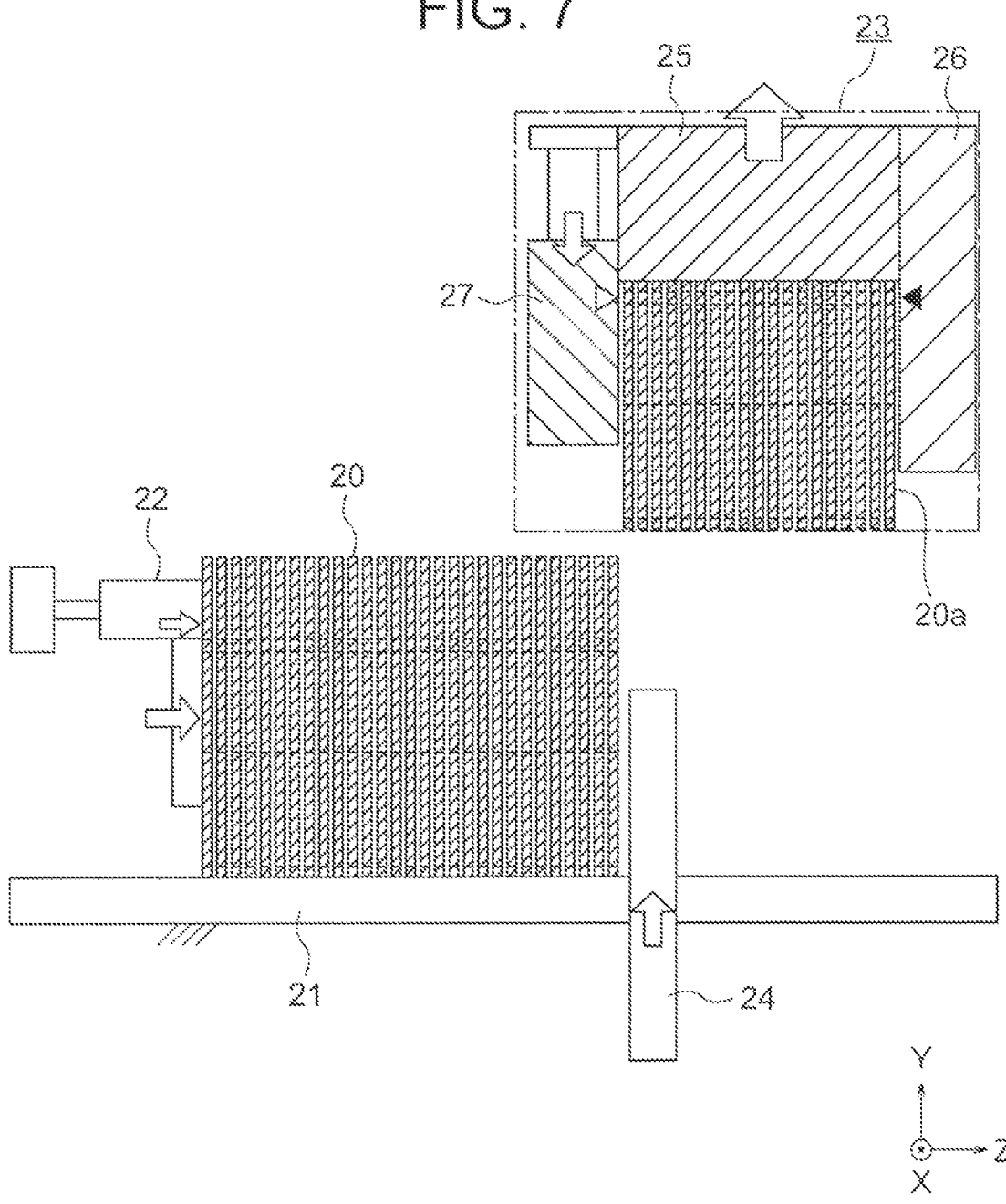
FIG. 7 is a side view for illustrating a state of a stage subsequent to FIG. 6.

FIG. 6 is a side view for illustrating a main part of the manufacturing apparatus for a laminated core according to the first embodiment. FIG. 7 is a side view for illustrating a state of a stage subsequent to FIG. 6.

The manufacturing apparatus for a laminated core includes a rail 21, a pressing device 22, a core separating device 23, and a first receiver 24.

On the rail 21, the plurality of core elements 4 manufactured by the element manufacturing apparatus of FIG. 4 are conveyed as an element laminate 20. The element laminate 20 is formed by laminating the plurality of core elements 4.

Further, the element laminate 20 is placed on the rail 21 such that the tooth portions 4b of the core elements 4 are on a lower side. That is, the lamination direction of the element laminate 20 on the rail 21 is the horizontal direction, specifically, a direction parallel to a Z-axis of FIG. 6. However, the lamination direction is not limited to the horizontal direction, and may be, for example, the up-and-down direction.

The pressing device 22 presses the element laminate 20 on the rail 21 in the lamination direction. Further, the pressing device 22 presses the element laminate 20 with a pressing force which is smaller than such a pressing force that leads to limitation on further reduction in dimension of the element laminate 20 in the lamination direction. That is, the pressing device 22 presses the element laminate 20 with such a pressing force that prevents saturated lamination. In this manner, the pressing device 22 elastically deforms at least some of the core elements 4 in the lamination direction.

The core separating device 23 takes out, from the element laminate 20, a separated laminate 20a being a part of the element laminate 20. Specifically, the core separating device 23 moves, from the element laminate 20 being pressed by the pressing device 22, a part of the element laminate 20 in a direction orthogonal to the lamination direction by a set dimension in the lamination direction, to thereby obtain the separated laminate 20*a*. The core separating device 23 of the first embodiment pulls a part of the element laminate 20 straight upward to obtain the separated laminate 20*a*.

Further, the core separating device 23 moves the separated laminate 20*a* while pressing the separated laminate 20*a* in the lamination direction with a pressing force that is equal to the pressing force applied to the element laminate 20 by the pressing device 22.

The core separating device 23 includes a grasping device 25, a second receiver 26, and a holding device 27.

The grasping device 25 grasps the separated laminate 20*a*. Further, the grasping device 25 is movable upward and downward relative to the rail 21.

The second receiver 26 is arranged on a side opposite to the pressing device 22 over the element laminate 20 before the separated laminate 20*a* is taken out. In this manner, the second receiver 26 supports the pressing force applied to the element laminate 20 by the pressing device 22.

Further, the second receiver 26 is adjacent to the grasping device 25, and is movable upward and downward relative to the rail 21 integrally with the grasping device 25.

The holding device 27 is adjacent to the grasping device 25 on a side opposite to the second receiver 26. Further, the holding device 27 is brought into abutment against a surface of the element laminate 20 on a side opposite to the rail 21, that is, an upper surface before the separated laminate 20*a* is taken out.

Further, the holding device 27 is movable upward and downward relative to the rail 21 independently of the grasping device 25. Further, when the separated laminate 20*a* is taken out by the grasping device 25, the holding device 27 grasps the separated laminate 20*a* between holding device 27 and the second receiver 26.

The first receiver 24 is movable upward and downward between a waiting position illustrated in FIG. 6 and a projecting position illustrated in FIG. 7. The waiting position is a position at which the first receiver 24 does not project beyond the rail 21. The projecting position is a position at which the first receiver 24 projects beyond the rail 21.

When the separated laminate 20*a* is to be taken out by the grasping device 25, the first receiver 24 moves to the projecting position to prevent the plurality of core elements 4 remaining on the rail 21 from falling down.

Figure 8:
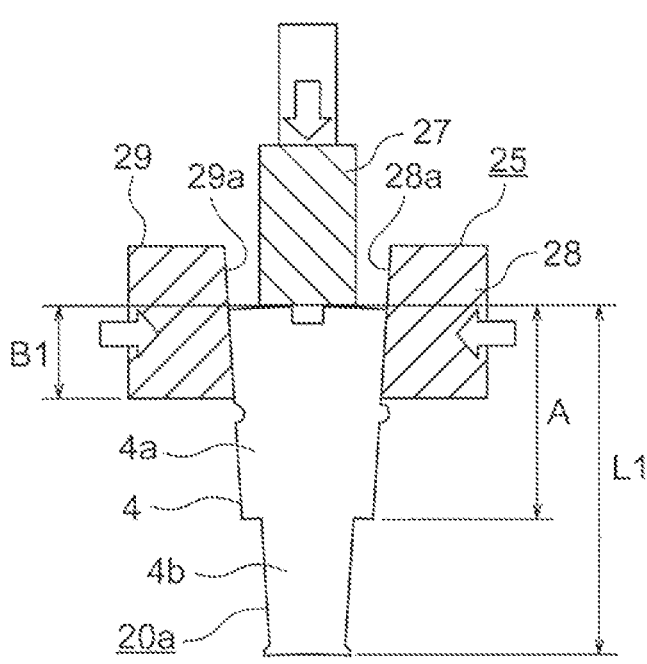
FIG. 8 is a front view for illustrating a grasping device and a holding device of FIG. 6.
Figure 8:
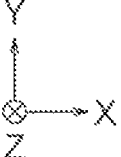

FIG. 8 is a front view for illustrating the grasping device 25 and the holding device 27 of FIG. 6. The grasping device 25 includes a first grasping member 28 and a second grasping member 29. The first grasping member 28 and the second grasping member 29 are each movable in a direction of approaching and separating from the separated laminate 20*a*.

The separated laminate 20*a* is grasped, at the yoke portion 4*a* of each core element 4, between the first grasping member 28 and the second grasping member 29. The grasping device grasps the separated laminate 20*a* from a direction perpendicular to the lamination direction, that is, from a direction corresponding to the circumferential direction of the laminated core 1.

The first grasping member 28 has a first grasping surface 28*a* which is to be brought into contact with the separated laminate 20*a*. The second grasping member 29 has a second grasping surface 29*a* which is to be brought into contact with the separated laminate 20*a*. The first grasping surface 28*a* and the second grasping surface 29*a* being a pair of grasping surfaces are each inclined in such a tapered shape that a distance therebetween continuously increases as extending in the direction of moving the separated laminate 20*a*, that is, upward.

Here, in the separated laminate 20*a*, a direction corresponding to the radial direction of the laminated core 1, that is, a direction parallel to a Y-axis of FIG. 8 is referred to as an element radial direction. A dimension of the separated laminate 20*a* in the element radial direction is referred to as a core tooth length L1. Further, a dimension of the yoke portion 4*a* in the element radial direction is referred to as a yoke thickness A. Furthermore, a range in which the grasping device 25 and the separated laminate 20*a* overlap each other in the element radial direction is referred to as a range B1.

In this case, B1<L1 is satisfied. In particular, in FIG. 8, B1<A<L1 is satisfied.

Figure 9:
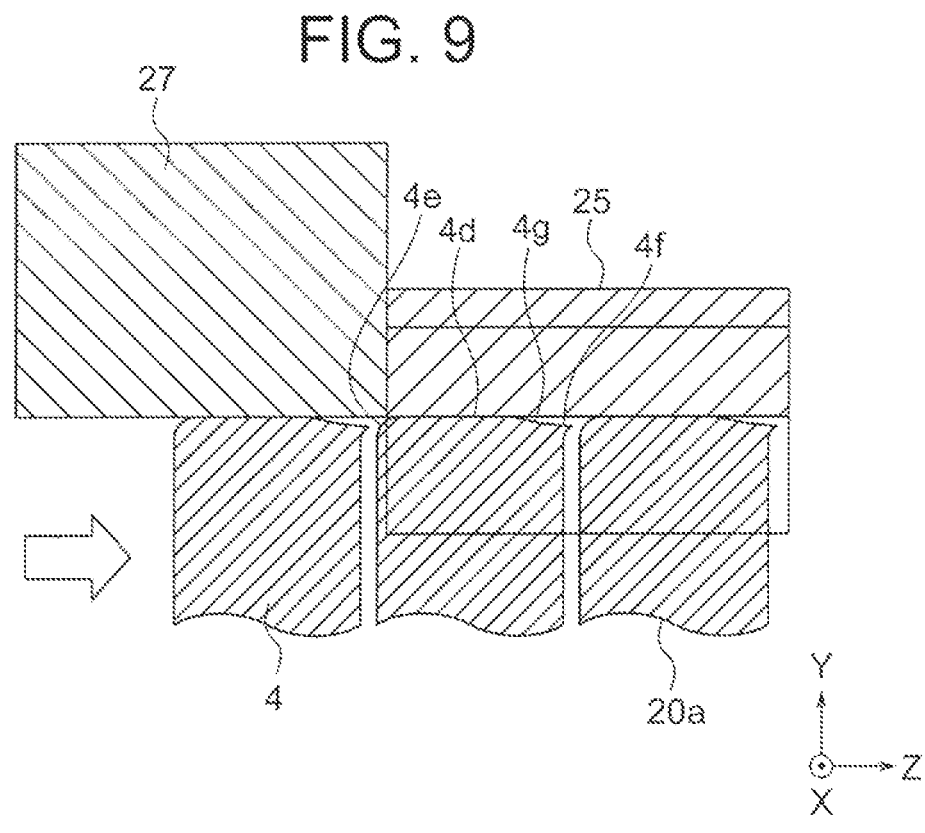
FIG. 9 is a sectional view for illustrating a first example of a state of an element laminate at a boundary portion between the grasping device and the holding device of FIG. 6.
Figure 10:
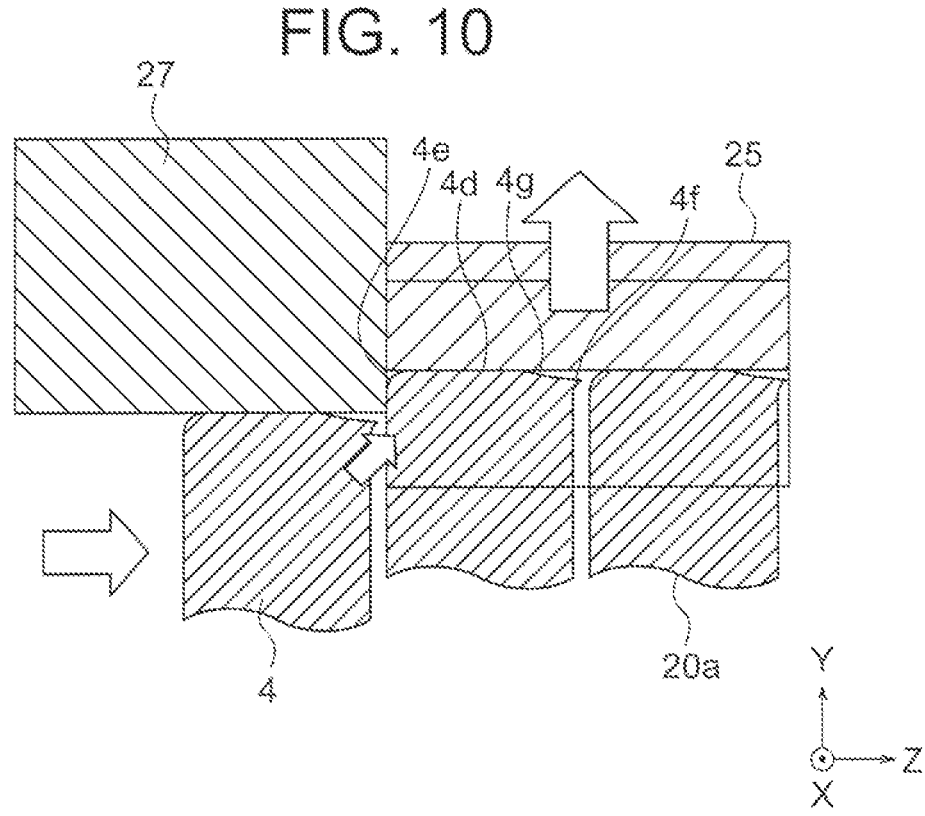
FIG. 10 is a sectional view for illustrating a state immediately after operation of taking out a separated laminate is started by the grasping device of FIG. 9.

FIG. 9 is a sectional view for illustrating a first example of a state of the element laminate 20 at a boundary portion between the grasping device 25 and the holding device 27 of FIG. 6. FIG. 10 is a sectional view for illustrating a state immediately after operation of taking out the separated laminate 20*a* is started by the grasping device 25 of FIG. 9.

In the first example, the rollover surface 4*e* of the core element 4 is located directly below the boundary portion between the grasping device 25 and the holding device 27. From this state, when the operation of taking out the separated laminate 20*a* is started, the rollover surface 4*e* hits a corner portion of the holding device 27. Then, while the separated laminate 20*a* is compressed in the lamination direction, the rollover surface 4*e* rides over the corner portion of the holding device 27. In this manner, the dimension of the separated laminate 20*a* in the lamination direction is maintained at the set dimension.

Figure 11:
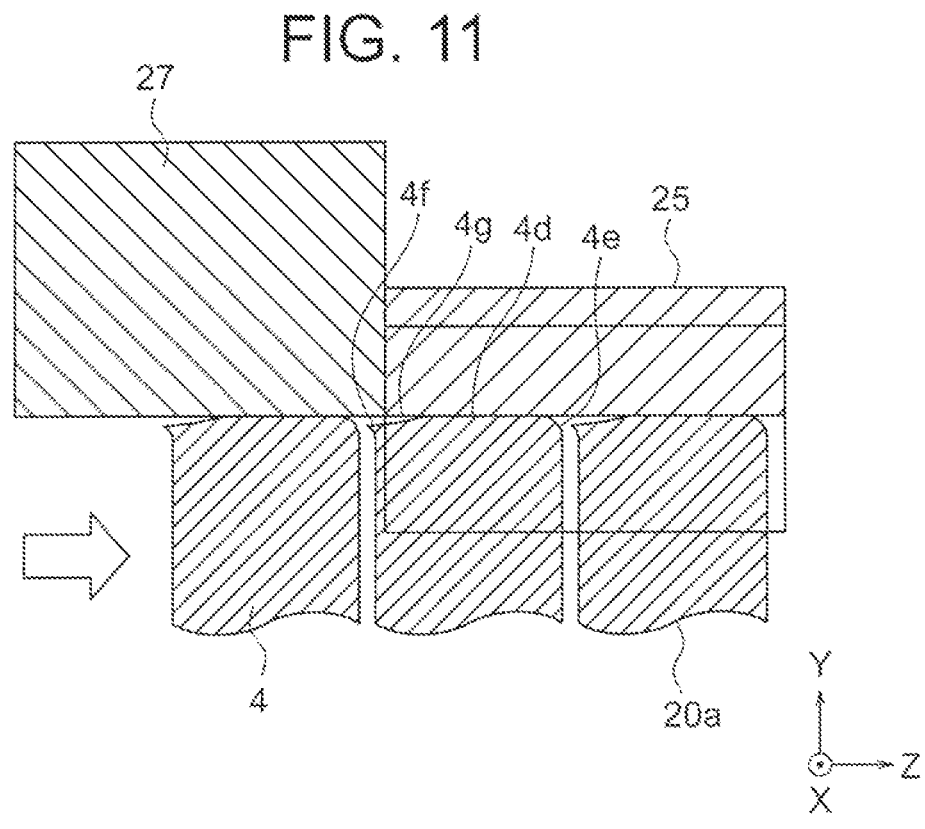
FIG. 11 is a sectional view for illustrating a second example of a state of the element laminate at the boundary portion between the grasping device and the holding device of FIG. 6.
Figure 12:
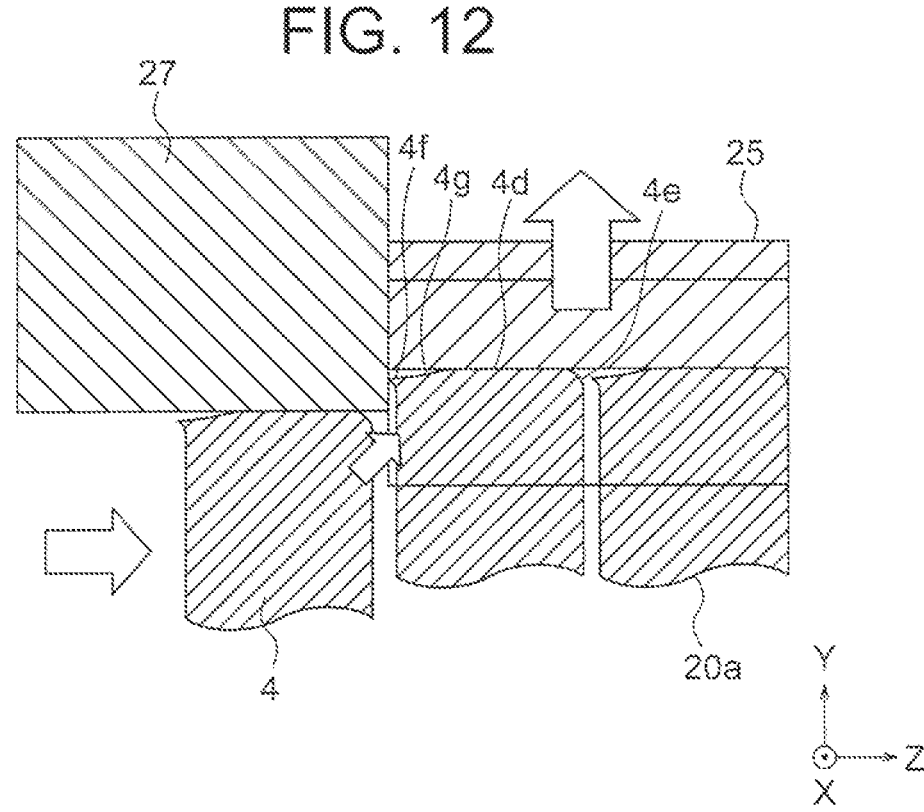
FIG. 12 is a sectional view for illustrating a state immediately after operation of taking out the separated laminate is started by the grasping device of FIG. 11.

FIG. 11 is a sectional view for illustrating a second example of a state of the element laminate 20 at the boundary portion between the grasping device 25 and the holding device 27 of FIG. 6. FIG. 12 is a sectional view for illustrating a state immediately after operation of taking out the separated laminate 20*a* is started by the grasping device 25 of FIG. 11.

In the second example, the burr surface 4*f* of the core element 4 is located directly below the boundary portion between the grasping device 25 and the holding device 27. From this state, when the operation of taking out the separated laminate 20*a* is started, the burr surfaces 4*f* hits a corner portion of the holding device 27. Then, while the separated laminate 20*a* is compressed in the lamination direction, the burr surfaces 4*f* rides over the corner portion of the holding device 27. In this manner, the dimension of the separated laminate 20*a* in the lamination direction is maintained at the set dimension.

When the separated laminate 20*a* is to be taken out from the element laminate 20, a gap dimension between adjacent core elements 4 is smaller than a sheet thickness of each core element 4.

The manufacturing method for a laminated core according to the first embodiment includes a core-block manufacturing step and a core-block coupling step.

In the core-block manufacturing step, a plurality of core blocks 3 are manufactured. In the core-block coupling step, the plurality of core blocks 3 are coupled to form an annular shape, thereby manufacturing the laminated core 1.

Figure 13:
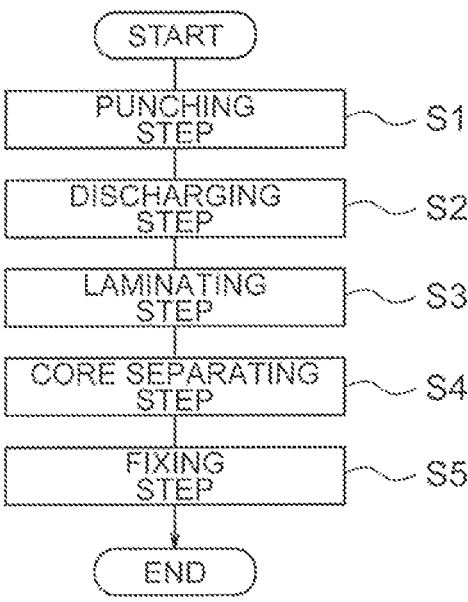
FIG. 13 is a flowchart for illustrating a core-block manufacturing step of a manufacturing method for a laminated core according to the first embodiment.

FIG. 13 is a flowchart for illustrating the core-block manufacturing step of the manufacturing method for a laminated core according to the first embodiment. The core-block manufacturing step includes a punching step S1, a discharging step S2, a laminating step S3, a core separating step S4, and a fixing step S5.

In the punching step S1, with use of the element manufacturing apparatus illustrated in FIG. 4, the plurality of core elements 4 are punched out from the electromagnetic steel sheet 10. In the discharging step S2, each core element 4 is discharged from the element manufacturing apparatus.

In the laminating step S3, the plurality of core elements 4 are supplied onto the rail 21 of FIG. 6, and the plurality of core elements 4 are laminated, thereby forming the element laminate 20.

In the core separating step S4, under a state in which the element laminate 20 is pressed by the pressing device 22, the separated laminate 20a is taken out from the element laminate 20 by the core separating device 23.

In the fixing step S5, the plurality of core elements 4 included in the separated laminate 20a are fixed to one another.

Figure 14:
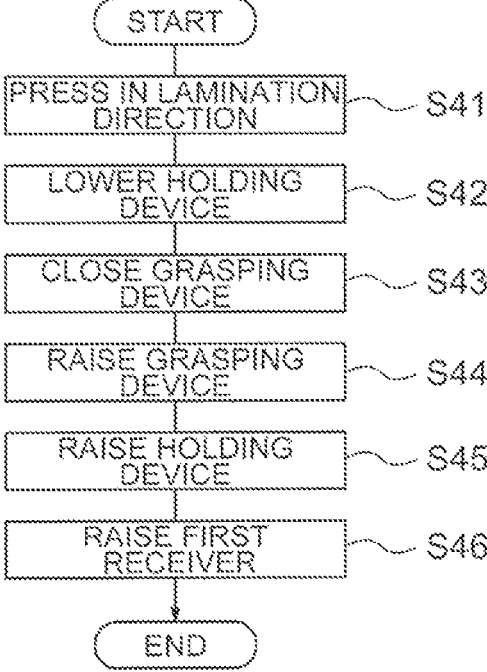
FIG. 14 is a flowchart for illustrating details of a core separating step of FIG. 13.

FIG. 14 is a flowchart for illustrating details of the core separating step S4 of FIG. 13. In the core separating step S4, in Step S41, the element laminate 20 is pressed in the lamination direction by the pressing device 22. Subsequently, in Step S42, the holding device 27 is lowered, and a portion adjacent to the separated laminate 20a in the element laminate 20 is pressed against the rail 21 by the holding device 27.

After that, in Step S43, the grasping device 25 is closed. That is, the separated laminate 20a is grasped by the first grasping member 28 and the second grasping member 29. Then, in Step S44, the grasping device 25 is raised together with the second receiver 26.

Further, in Step S45, the holding device 27 is raised, and in Step S46, the first receiver 24 is raised. In this manner, as illustrated in FIG. 7, the separated laminate 20a is taken out from the element laminate 20.

With such a manufacturing method for a laminated core and a manufacturing apparatus for a laminated core, in the core separating step S4, the separated laminate 20a is taken out from the element laminate 20 under the state in which the element laminate 20 is pressed in the lamination direction. Then, in the fixing step S5, the plurality of core elements 4 included in the separated laminate 20a are fixed to one another.

Thus, the separated laminate 20a can be taken out under a state in which the interlayer gap "d" is small, thereby being capable of improving the dimensional accuracy of the core block 3 in the lamination direction. In this manner, the dimensional accuracy of the laminated core 1 in the lamination direction can also be improved. For example, even when each core element 4 has a thickness of equal to or smaller than 0.25 mm, the dimensional accuracy of the core block 3 in the lamination direction can be sufficiently ensured.

Further, at the time of punching out each core element 4, even when the warpage, the sheet-thickness deviation, or the like occurs in the core element 4, the separated laminate 20a can be taken out with high accuracy.

Further, the separated laminate 20a can be taken out with high accuracy, and hence the productivity of the laminated core 1 is improved.

Further, the flow of the process from the core separating step S4 to the fixing step S5 can be smoothly carried out, thereby being capable of improving the productivity of the laminated core 1.

Further, a higher space factor of the laminated core 1 can be achieved. Thus, when the laminated core 1 is to be used for a motor, motor output can be improved.

Further, in the core separating step S4, the element laminate is pressed with the pressing force which is smaller than such a pressing force that leads to limitation on further reduction in dimension of the element laminate 20 in the lamination direction. Thus, the separated laminate 20a is compressible in the lamination direction, and hence the core element 4 located at an end portion of the separated laminate 20a is prevented from being bitten into the core separating device 23. In this manner, the separated laminate 20a is smoothly moved, thereby improving the productivity of the laminated core 1.

Further, in the core separating step S4, at least some of the core elements 4 are elastically deformed in the lamination direction by pressing the element laminate 20. In this manner, the separated laminate 20a is smoothly moved, thereby improving the productivity of the laminated core 1.

Further, in the core separating step S4, the separated laminate 20a is moved while the separated laminate 20a is pressed in the lamination direction with the pressing force that is equal to the pressing force applied to the element laminate 20. Thus, the dimension of the separated laminate 20a in the lamination direction is maintained, thereby being capable of improving the dimensional accuracy of the core block 3.

Further, the separated laminate 20a is a part of the laminated core 1 in the circumferential direction. Thus, the plurality of core elements 4 can easily be fixed by welding, bonding, adhesion, or winding of a lead wire.

Further, the grasping device 25 grasps the separated laminate 20a from a direction corresponding to the circumferential direction of the laminated core 1 and moves the separated laminate 20a. Thus, even when any core element 4 having a different punching dimension is mixed in the separated laminate 20a, all of the core elements 4 can be grasped more reliably.

Further, the range B1 in which the grasping device 25 and the separated laminate 20a overlap each other is smaller than the core tooth length L1. Thus, the range in which the grasping device 25 is in contact with the separated laminate 20a can be set small. Accordingly, the influence of the warpage of each core element 4, the sheet-thickness deviation of the plurality of core elements 4, the inclination of each core element 4, and the falling of each core element 4 is reduced. In this manner, a defect in the core separating step S4 is eliminated, and the productivity is thus improved.

Further, in the core separating step S4, the separated laminate 20a is grasped at the yoke portion 4a of each of the core elements by the grasping device 25. Thus, the separated laminate 20a can be taken out with high accuracy.

Further, the fixing step S5 is performed by welding, bonding, adhesion, or winding of a lead wire. Thus, through selection of an appropriate fixing method, the productivity of the core block 3 can be improved.

Further, the first grasping surface 28a and the second grasping surface 29a are each inclined in such a tapered shape that a distance therebetween continuously increases as extending in the direction of moving the separated laminate 20a. Thus, with use of the grasping device 25, the separated laminate 20a can be grasped more stably.

Second Embodiment

Figure 15:
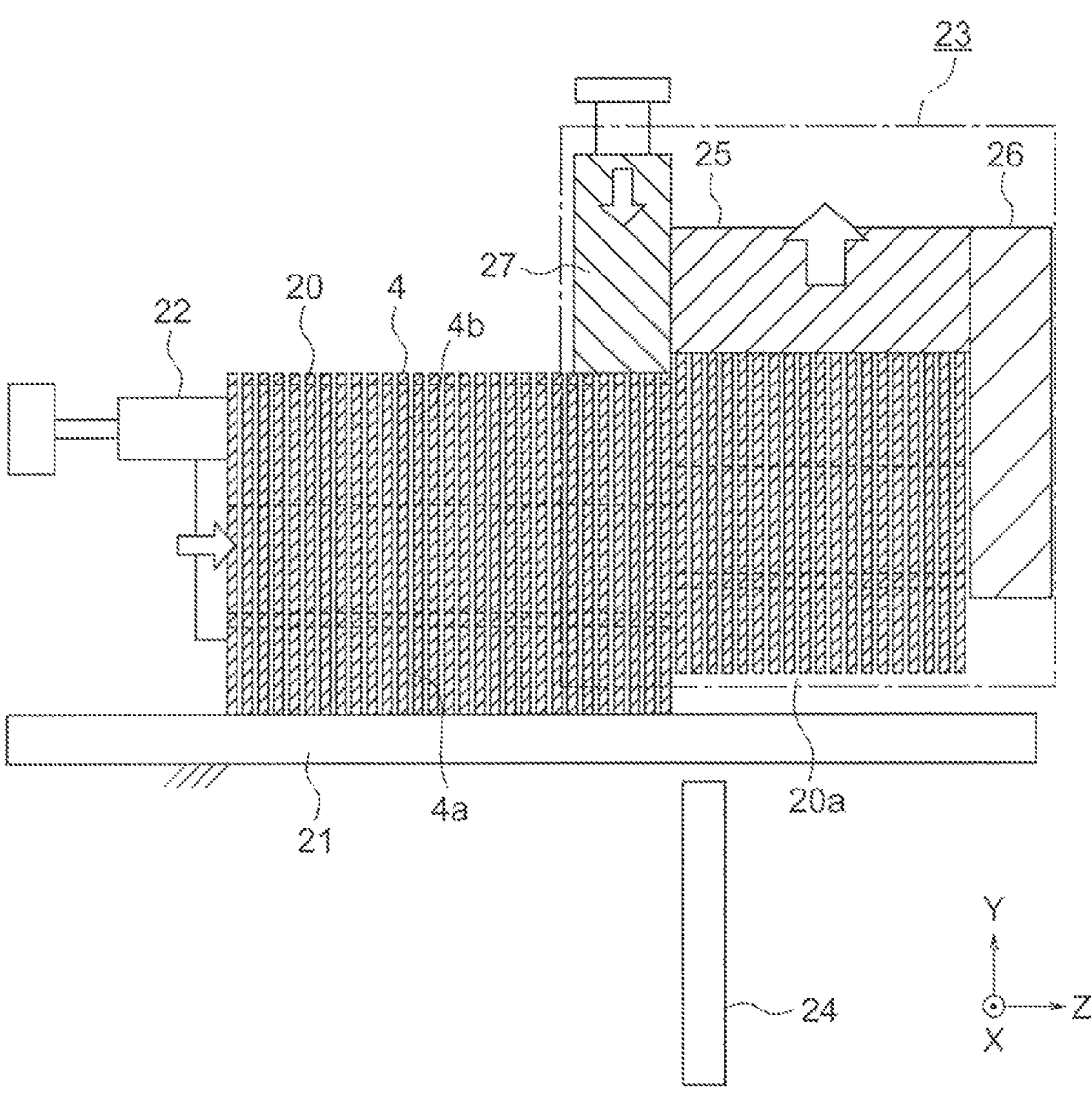
FIG. 15 is a side view for illustrating a main part of a manufacturing apparatus for a laminated core according to a second embodiment of this disclosure.
Figure 16:
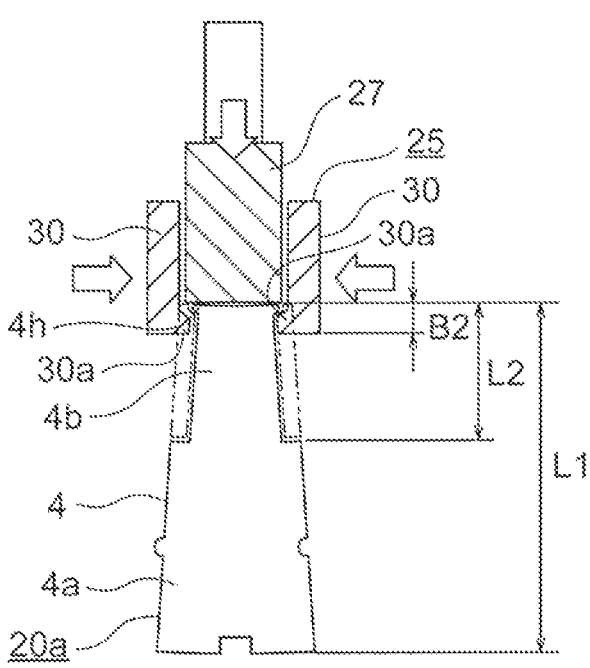
FIG. 16 is a front view for illustrating a grasping device and a holding device of FIG. 15.
Figure 16:
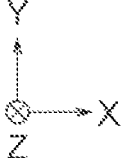

Next, FIG. 15 is a side view for illustrating a main part of a manufacturing apparatus for a laminated core according to a second embodiment of this disclosure. FIG. 16 is a front view for illustrating the grasping device 25 and the holding device 27 of FIG. 15.

In a core separating step of the second embodiment, the separated laminate 20a is grasped at the tooth portion 4b of each core element 4 by the grasping device 25.

A pair of flange portions 4h are provided at an end portion of the tooth portion 4b on a side opposite to the yoke portion 4a. Each flange portion 4h projects, from the tooth portion 4b, in a direction corresponding to the circumferential direction of the laminated core 1.

The grasping device 25 of the second embodiment includes a pair of grasping members 30. The pair of grasping members 30 are opposed to each other. Further, each grasping member 30 is movable in a direction of approaching and separating from the separated laminate 20a.

A hook portion 30a is provided at a lower end portion of each grasping member 30. Each hook portion 30a projects toward the tooth portion 4b. When the separated laminate 20a is to be taken out by the grasping device 25, each hook portion 30a is hooked to a corresponding one of the flange portions 4h.

In this case, a dimension of the tooth portion 4b in the element radial direction is referred to as a tooth length L2. Further, a range in which the grasping device 25 and the separated laminate 20a overlap each other in the element radial direction is referred to as a range B2. In this case, B2<L2<L1 is satisfied.

Other configurations and a manufacturing method of the second embodiment are similar or identical to those of the first embodiment.

Effects similar to those of the first embodiment can be obtained also with such a manufacturing apparatus for a laminated core and a manufacturing method for a laminated core.

Further, the pair of hook portions 30a are hooked to the pair of flange portions 4h. Accordingly, the separated laminate 20a can be taken out from the element laminate 20 and transferred more reliably.

Third Embodiment

Figure 17:
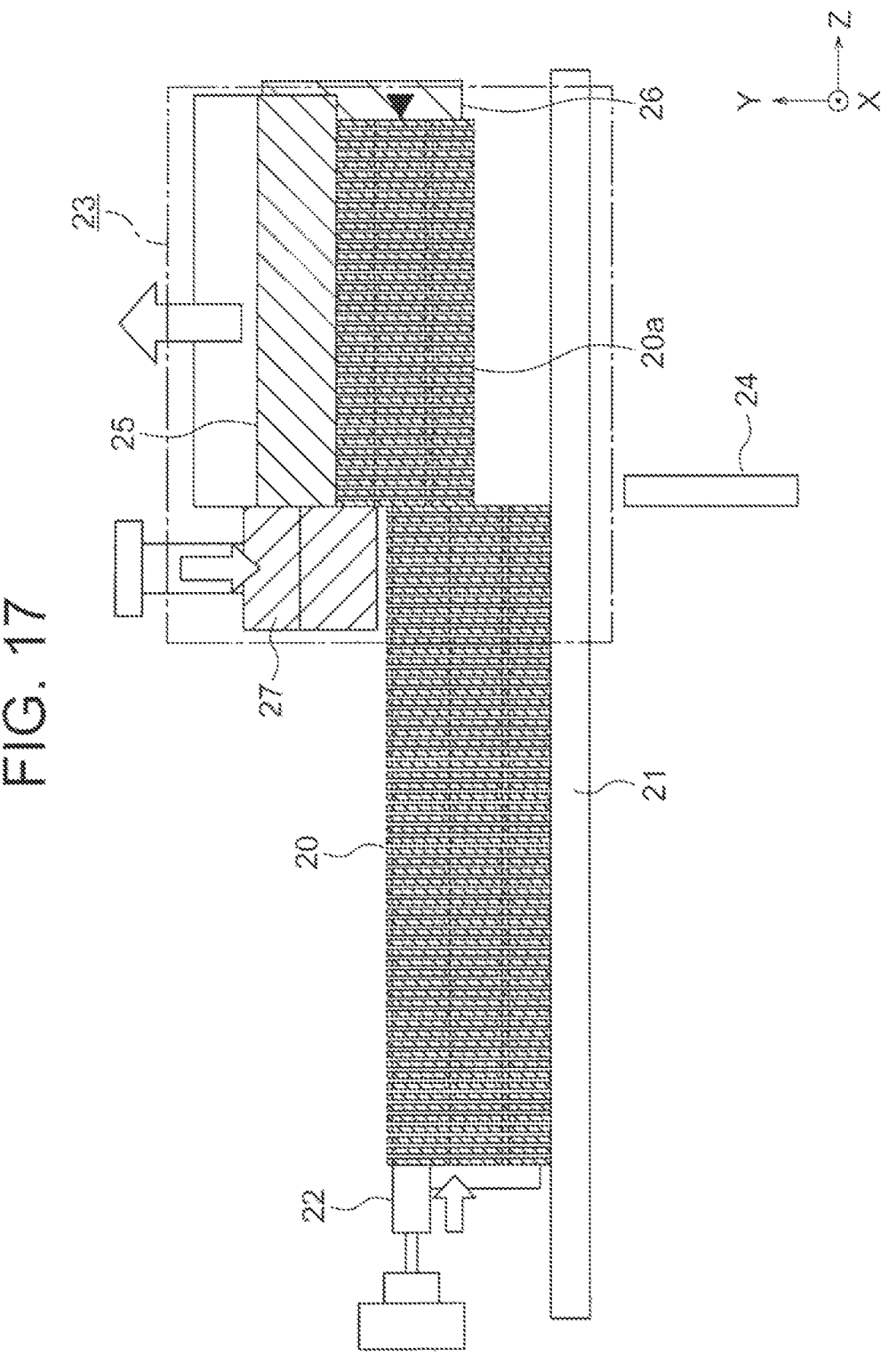
FIG. 17 is a side view for illustrating a main part of a manufacturing apparatus for a laminated core according to a third embodiment of this disclosure.
Figure 18:
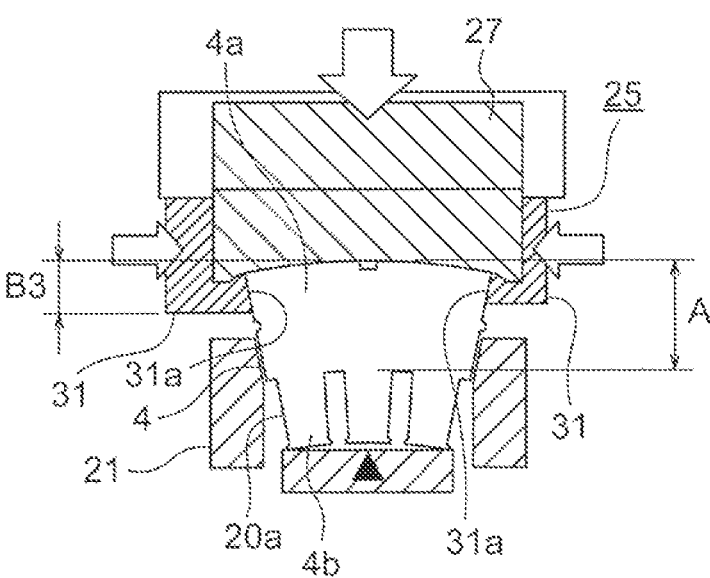
FIG. 18 is a front view for illustrating a grasping device and a holding device of FIG. 17.
Figure 18:

Next, FIG. 17 is a side view for illustrating a main part of a manufacturing apparatus for a laminated core according to a third embodiment of this disclosure. FIG. 18 is a front view for illustrating the grasping device 25 and the holding device 27 of FIG. 17.

In the third embodiment, three tooth portions 4b are provided to each core element 4. The grasping device 25 includes a pair of grasping members 31. The pair of grasping members 31 are opposed to each other. Further, each grasping member 31 is movable in a direction of approaching and separating from the separated laminate 20a.

Each grasping member 31 has a grasping surface 31a which is to be brought into contact with the separated laminate 20a. The pair of grasping surfaces 31a are each inclined in such a tapered shape that a distance therebetween continuously increases as extending in the direction of moving the separated laminate 20a, that is, upward.

A surface of the holding device 27 to be brought into contact with the element laminate 20 is a curved surface conforming to the element laminate 20.

In this case, a dimension of the yoke portion 4a in the element radial direction is referred to as the yoke thickness A. Further, a range in which the grasping device 25 and the separated laminate 20a overlap each other in the element radial direction is referred to as a range B3. In this case, B3<A is satisfied.

Other configurations and a manufacturing method of the third embodiment are similar or identical to those of the first embodiment.

Effects similar to those of the first embodiment can be obtained also with such a manufacturing apparatus for a laminated core and a manufacturing method for a laminated core.

In the first embodiment, the number of segments N of the laminated core 1 is 48, but the number of segments N is not limited to 48. For example, as illustrated in FIG. 19, the number of segments N=8 may be given.

Figures 19, 20:
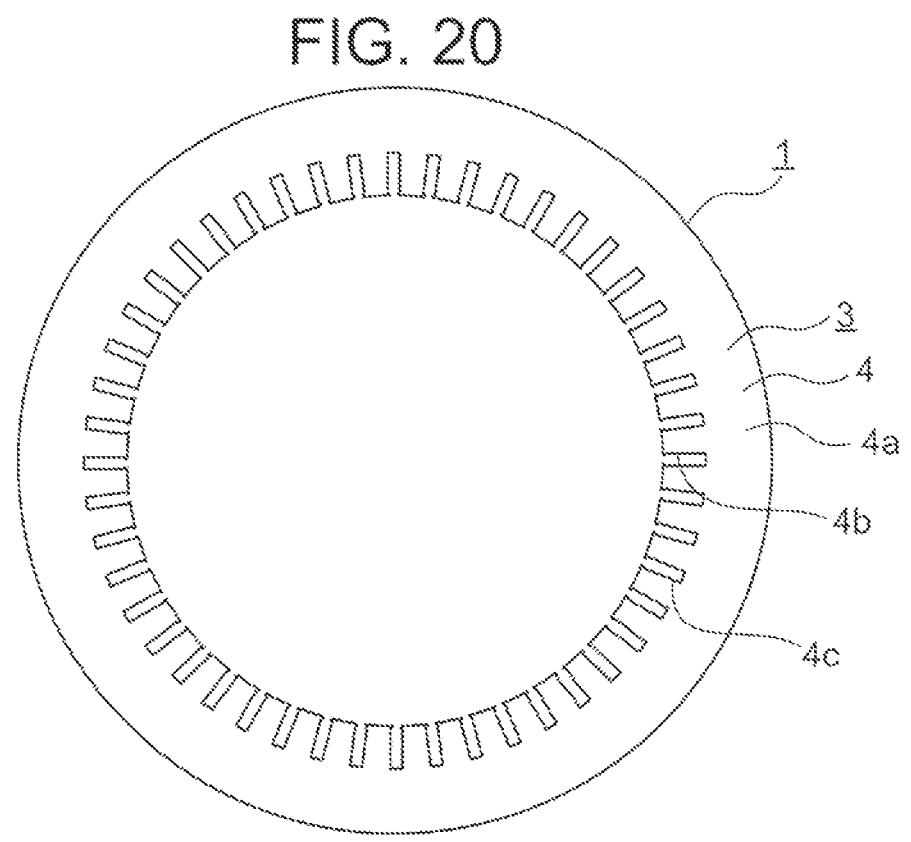
FIG. 19 is a plan view for illustrating an example of a laminated core in which the number of segments is different from that of FIG. 1.
FIG. 20 is a plan view for illustrating an example of a laminated core in which the number of segments is zero.

Further, the number of segments N may be 0 as illustrated in FIG. 20 as long as the number is a non-negative integer other than 1. In a motor using the laminated core 1 with N=0, it is assumed that a diameter of the laminated core 1 may fall within a range of from 100 mm to 300 mm depending on the motor output. In this case, the separated laminate 20a can be grasped at the tooth portion 4b of each core element 4 by the grasping device 25, thereby being capable of taking out the separated laminate 20a with high accuracy.

Further, each core block 3 may be formed by laminating two or more separated laminates 20a in the lamination direction.

Further, although description has been made of the laminated core 1 to be used for a stator of a rotating electric machine in the first to third embodiments, the laminated core 1 may be used for a rotor.

What is claimed is:

1. A manufacturing method for a laminated core of a rotating electric machine using an apparatus, the method comprising steps of:

laminating a plurality of core elements each punched out from an electromagnetic steel sheet, to thereby form an element laminate in a lamination direction by a pressing device of the apparatus;

moving the element laminate and separating a part of the element laminate from the element laminate by a grasping device of the apparatus, the grasping device being configured to grasp side surfaces of the part of the element laminate in a circumferential direction and move the part of the element laminate in a direction orthogonal to the lamination direction by a set dimension in the lamination direction, while the element laminate is pressed in a lamination direction of the plurality of core elements, to thereby obtain a separated laminate; and fixing the plurality of core elements included in the separated laminate to one another.

2. The manufacturing method according to claim 1, wherein the moving and the separating comprises pressing the element laminate with a pressing force which is smaller than such a pressing force that leads to limitation on further reduction in dimension of the element laminate in the lamination direction.

3. The manufacturing method according to claim 2, wherein the moving and the separating comprises elastically deforming at least some of the core elements in the lamination direction by pressing the element laminate.

4. The manufacturing method according to claim 1, wherein the moving and the separating comprises moving the separated laminate while the separated laminate is pressed in the lamination direction with a pressing force that is equal to the pressing force applied to the element laminate.

5. The manufacturing method according to claim 1, wherein the fixing is performed by welding, bonding, adhesion, or winding of a lead wire.

6. The manufacturing method according to claim 1, wherein the separated laminate is a part of the laminated core in a circumferential direction of the laminated core, and wherein the method further comprises forming the laminated core by combining a plurality of separated laminates.

7. The manufacturing method according to claim 6, wherein, in a circumferential direction of the laminated core, the grasping device overlaps the separated laminate in a range that is smaller than a dimension of the separated laminate.

8. The manufacturing method according to claim 6, wherein each of the core elements comprises a yoke portion, and wherein the moving and the separating comprises grasping, by the grasping device, the yoke portion of each of the core elements in the separated laminate.

9. The manufacturing method according to claim 6, wherein each of the core elements comprises a yoke portion and a tooth portion protruding from the yoke portion toward an axial center, and wherein the moving and the separating comprises grasping, by the grasping device, the tooth portion of each of the core elements in the separated laminate.

\* \* \* \* \*